Figure 1:
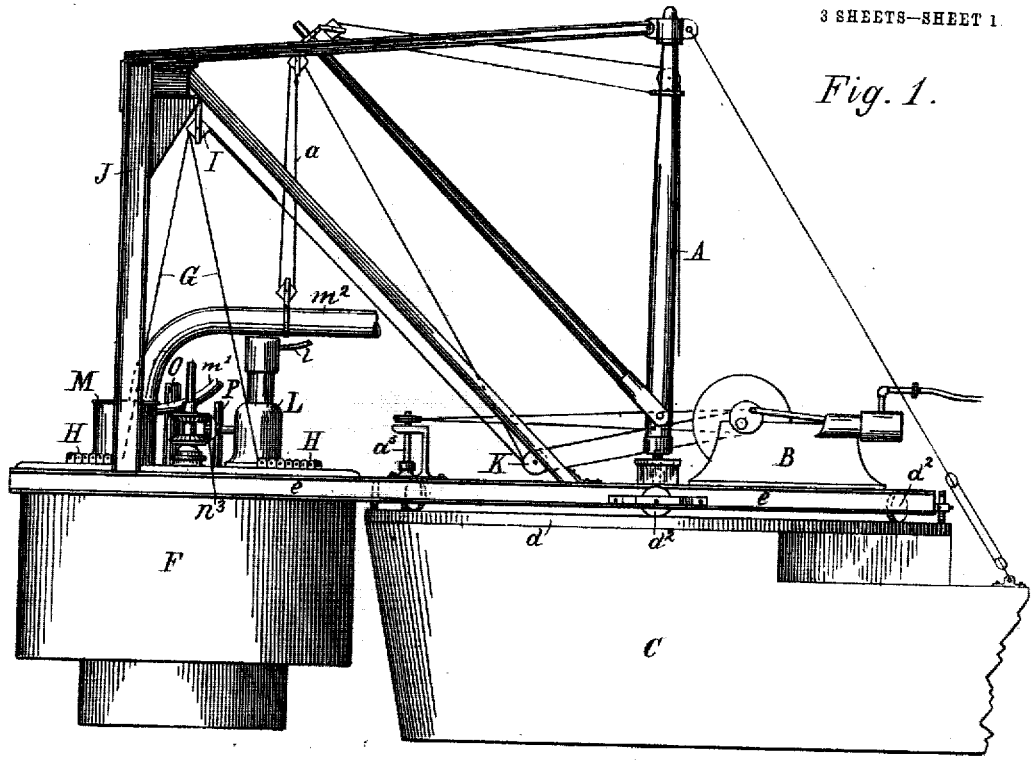

No. 822,865. PATENTED JUNE 5, 1906.
T. P. PAYNE.
EXCAVATOR.
APPLICATION FILED MAR. 28, 1903.

3 SHEETS—SHEET 1.

WITNESSES:
Lucius Varney
A. N. Jestina

INVENTOR.
Thomas P. Payne
BY
Redding Kiddle & Greeley
ATTORNEYS.

No. 822,865. PATENTED JUNE 5, 1906.
T. P. PAYNE.
EXCAVATOR.
APPLICATION FILED MAR. 28, 1903.

3 SHEETS—SHEET 2.

WITNESSES:
Lucius Varney
A. N. Jeshma

INVENTOR.
Thomas P. Payne
BY
Redding Kiddle & Greeley
ATTORNEYS

No. 822,865. PATENTED JUNE 5, 1906.
T. P. PAYNE.
EXCAVATOR.
APPLICATION FILED MAR. 28, 1903.

3 SHEETS—SHEET 3.

WITNESSES:
Lucius Varney.
A. A. Jasbrra.

INVENTOR.
Thomas P. Payne
BY
Redding Kiddle & Greeley
ATTORNEYS.

UNITED STATES PATENT OFFICE.

THOMAS P. PAYNE, OF NEW YORK, N. Y., ASSIGNOR TO MARVIN H. PAYNE, OF NEW YORK, N. Y.

EXCAVATOR.

No. 822,865.   Specification of Letters Patent.   Patented June 5, 1906.

Application filed March 28, 1903. Serial No. 149,949.

*To all whom it may concern:*

Be it known that I, THOMAS P. PAYNE, a citizen of the United States, residing in the borough of Manhattan, city, county, and State of New York, have invented certain new and useful Improvements in Excavators, of which the following is a specification, reference being had to the accompanying drawings, forming a part hereof.

In making excavations of various kinds, and particularly in dredging operations where the spoil or excavated matter has consisted largely of substances of small specific gravities—as, for instance, soft soils composed of silt, clay, fine sand, &c.—it has sometimes been found convenient to employ a pump or a so-called "air-lift" to discharge the excavated matter, such matter being held in suspension in water which either existed or was supplied at the base of operations. One difficulty with this method of excavating as practiced heretofore has been the necessity of maintaining a current of great velocity in order to discharge anything, except the very lightest substances, and even with a current of great velocity substances other than the very lightest could not be discharged with any degree of facility above a certain height. The apparatuses employed heretofore to carry this method into effect have in general included an agitator or brush which served to loosen the material to be excavated, and the excavated material being stirred up in the water surrounding the agitator was discharged with such water either by the air-lift apparatus or by a pump up into which it had to be drawn by suction. In these apparatuses where a pump was used such spoil as reached the pump would generally be discharged but oftentimes the suction or lifting-force would be insufficient to prevent the settling back of the excavated matter. I have found that by so arranging the apparatus that the lifting force is applied in such a way as to drive the spoil up and out instead of drawing it up into the pump and then discharging it materially improved results are secured as regards the raising of spoil containing coarse substances of considerable specific gravity, such substances, even including boulders, being readily discharged when driven up and out when they would not be lifted by any suction which could be created or maintained.

One object of the present invention is to provide an improved excavating apparatus in which the lifting force for the spoil may be applied in such a way as to drive the spoil up and out instead of drawing it up and out, and for this purpose the agitator, which is provided at the end of the excavating-chamber to cut away the matter to be excavated and keep the spoil stirred up in the water that substantially fills the excavating-chamber, has adjacent thereto a pump or other lifting device, and this pump or lifting device during the operation of the apparatus becomes immersed in the spoil. On account of the relative positions of the pump and agitator in the excavating-chamber the space in the excavating-chamber is always lifted by a force from behind and is thus driven up and out and discharged, no suction or lifting force whatever being required to draw the spoil into the pump.

Another object of this invention is to simplify the means of supplying power to the agitator and to the pump, whereby such power may not only be more economically transferred to the parts in question, but also that the apparatus may be the more compactly constructed and the more easily handled.

The different features of improvement referred to will now be described with reference to the accompanying drawings, in which the improved apparatus is illustrated as secured to a telescoping caisson which is attached to a scow, such as might constitute part of a dredging apparatus or a machine for placer-mining, the scow in such case forming a support for the caisson-shaft and the caisson-shaft a support for the improvements now under consideration. It will be understood, however, that the caisson and scow are shown merely for purposes of illustration and explanation and that the invention is not limited to use in connection with either or both. These parts of the apparatus will, however, be described and explained in order to enable the entire apparatus to be completely understood.

Figure 2:
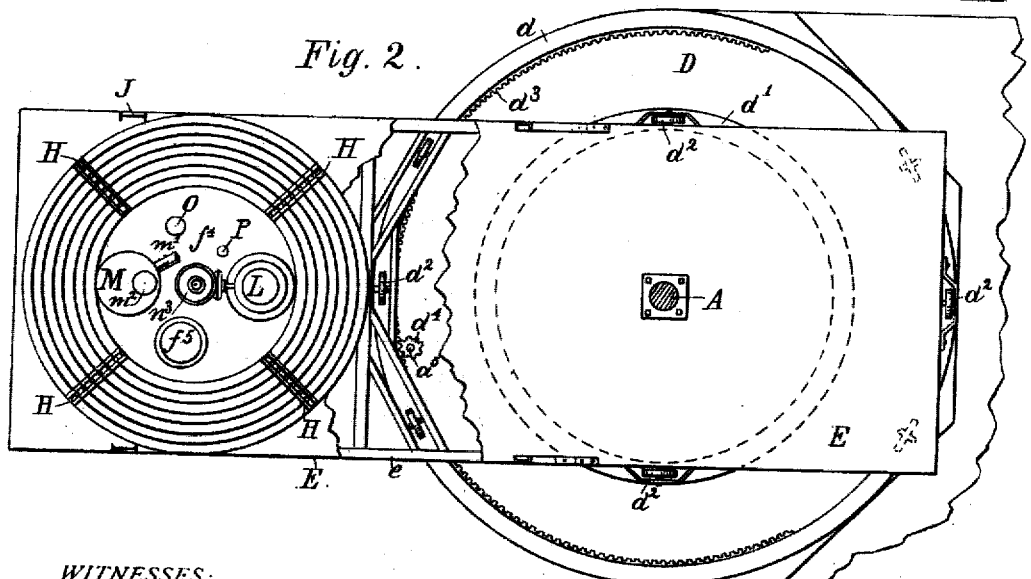
Figure 3:
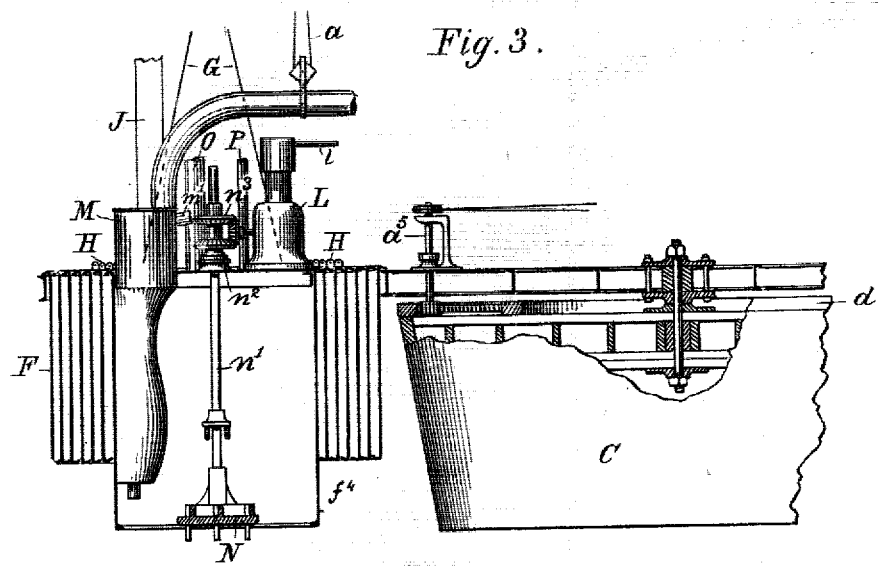
Figure 6:
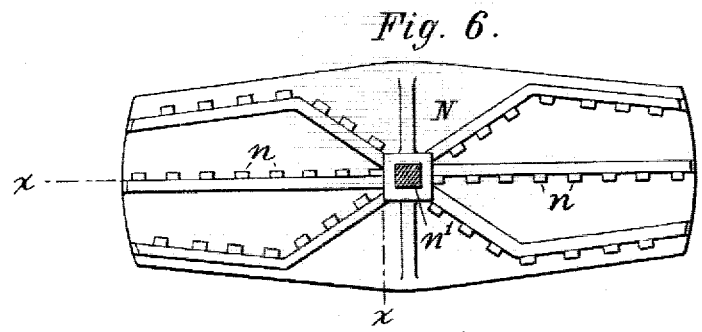
Figure 7:
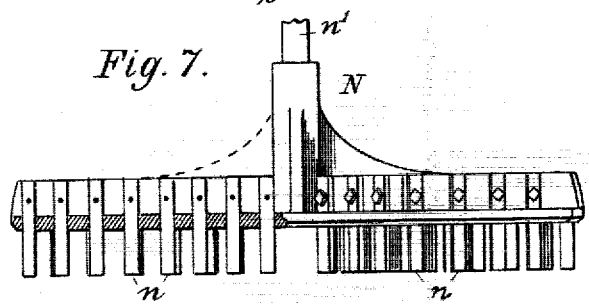
Figure 4:
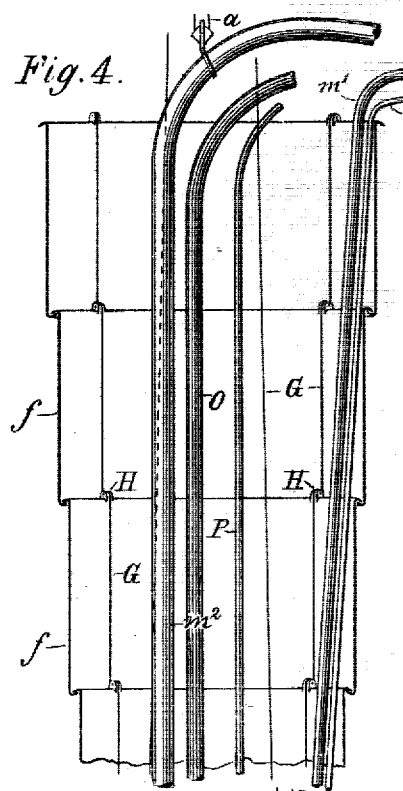
Figure 5:
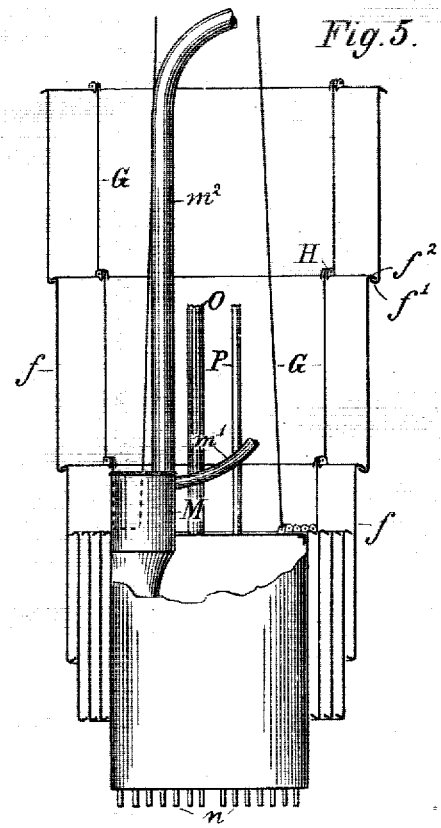
Figure 8:
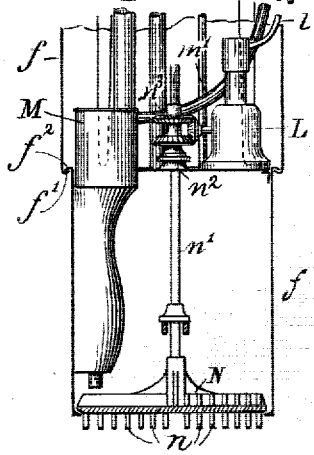
Figure 8:
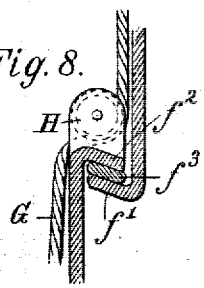

In said drawings, Figure 1 is a view in side elevation of a dredging apparatus to which the invention is applied. Fig. 2 is a plan view, a derrick and certain framework forming a part of the apparatus being shown in sections and a portion of a turn-table, which is also a part of the apparatus, being broken away to show the parts beneath. Fig. 3 is a view in longitudinal central section, the scow being shown in elevation. Fig. 4 is a view in central vertical section of the telescoping caisson with the sections fully extended. Fig. 5 is a view in central vertical section of a telescoping caisson with the sections partially extended, as they will be when the apparatus is in operation. Figs. 6 and 7 are views of an excavating-brush which may be used in connection with the telescoping caisson, Fig. 6 being a top view and Fig. 7 a view partly in side elevation and partly in central longitudinal section. Fig. 8 is a detailed view in section illustrating the connection between the several sections of the telescoping section.

On the dredging apparatus shown in the drawing and in connection with which the invention may be used are a hoisting apparatus or derrick A and a hoisting-engine B, which are mounted in convenient positions upon a scow C. Inasmuch as the form or construction of the scow, as well as that of the derrick and engine, is immaterial to the present invention, these parts are not illustrated in detail, the scow, for instance, being only partially shown; but it will be understood that these several parts may be chosen and arranged as convenience may dictate and that the scow may be divided into the usual compartments for the reception of fuel, stores, and tools. It will also be understood that other parts of the dredging apparatus than those mentioned may be added or that the parts mentioned may be omitted altogether so far as the invention is concerned.

At one end of the scow a turn-table D is securely mounted, two circular tracks $d$ and $d'$ being provided upon the deck of the scow, upon which tracks the rollers or wheels $d^2$ of the turn-table are adapted to travel, and an internal gear $d^3$ is also provided upon the deck of the scow, being engaged by a pinion $d^4$, carried upon a shaft $d^5$, journaled in the turn-table, by which said table may be brought to and held in any position.

To the turn-table a strong rectangular frame E is secured, said frame preferably comprising steel I-beams $e$ and being bolted to the table D in such a way as to permit one end of said frame to project out beyond the end of the scow. Upon this projecting end of the frame E a working or excavating caisson F is secured or hung, the caisson being capable of swinging about one end of the scow, which swinging is produced by the movement of the turn-table D. The scow thus forms a support or carrier for both the turn-table and the caisson F, although any other suitable support or carrier may be provided, the nature of which support or carrier will depend generally upon the character and location of the place to be excavated.

The caisson F, which may be any form of sectional shaft, comprises, preferably, a series of telescoping sections $f$ and is secured to the frame E by supporting the top and broadest section of said caisson upon the projecting end of said frame in any suitable manner, said section being movably supported upon said frame or fixed thereto, as desired. These sections are preferably of the same length, with the exception of the lower section or excavating-chamber $f^4$, which is slightly extended to provide sufficient room for the excavating-tool and its attachments, to be referred to farther on. Each section $f$, with the exception of the lowest section, is provided upon its lower end with an upwardly and interiorly projecting flange $f'$, which when the caisson is extended is adapted to engage a downwardly and exteriorly projecting flange $f^2$ on the upper end of the adjacent lower section. The series of sections of the caisson are thus permitted to be folded together within the largest and uppermost section, Figs. 1 and 3, or to be extended to form a tubular excavating-shaft, Figs. 4 and 5.

The raising and lowering of the caisson-sections is preferably controlled by ropes or cables G, the ends of which are made fast to the uppermost section or to the frame E, these ropes passing through blocks or sheaves H upon the several sections. These blocks or sheaves are made fast to the tops of the sections, there being preferably four blocks on each section, as shown in Fig. 4. The rope G is passed from the outside through one block and then down and through the next block directly underneath in the same manner, all the blocks directly beneath each other being thus connected together, while the rope passes from each of the blocks on the lower section up through the caisson-chamber, through blocks I on a standard J, to and around a hoisting-drum K, controlled by the engine B. By slackening on ropes G it will be obvious that the sections will be lowered and become extended of their own weight, while by drawing said ropes up and around the drum K the sections will be raised and folded together.

The lowermost and narrowest section $f^4$ of the caisson, as before stated, is the excavating-chamber, the other sections of the telescoping caisson, the turn-table support, the scow, and all of the other parts of the apparatus hereinbefore described serving as simple and convenient means for supporting or suspending the excavating-chamber and for directing and controlling the position and movements of the excavating-chamber; but, as will be obvious, other means of support and control may be used, and the invention is not limited to any particular means of support or control therefor. Moreover, as will be seen later on, the excavating-chamber may be advanced horizontally, as will be convenient in tunneling, for instance, instead of being advanced vertically in the manner above described. This excavating-chamber $f^4$ is tight both at the top and at the sides, being open only at the bottom. Communicating with chamber $f^4$ is a water-supply pipe O, which is connected with a suitable source of water-supply, whereby water may be continuously furnished when necessary to said chamber during the operation therein. Mounted upon the caisson is an engine L for operating the excavating-tool and such other apparatus as may require motive power. This engine is placed, preferably, upon the top of the chamber $f^4$. Also mounted upon the chamber is a pump M, preferably of the centrifugal type, for use in removing the excavated matter or spoil which, as before stated, is held in suspension in the water within the excavating-chamber. Neither the engine nor the pump need be shown or described in detail. The engine should be sufficiently protected from any water which might enter the caisson and hinder its operation, and the pump for the excavated material should be placed as near the excavating-tool as practicable with its inlet-opening just above said tool.

A flexible pipe $l$ is provided for furnishing the engine with a motive fluid, and said pipe extends upward within the caisson-shaft from the engine L to a source of fluid-power supply. (Not shown.) The pump, which may be secured in any convenient manner within the chamber $f^4$, as to the wall of the chamber, is provided with flexible pipes $m'$ and $m^2$, which also extend upward within the caisson-chamber, one of which serves as a motive-fluid-supply pipe for the pump and the other for receiving the discharge therefrom. If preferable, the pump may be driven by engine L. The discharge-pipe $m^2$ and the inlet-opening $m^3$ of the pump are of such dimensions as to make them about twice the capacity of the water-supply pipe O; but any other relation between the sizes of these pipes may exist, if desired. The reason for making the discharge-pipe twice the capacity of the water-supply pipe is that when the apparatus is working under ordinary conditions the water admitted into the excavating-chamber through the water-supply pipe O will be discharged through the pump and discharge-pipe $m^2$ with about an equal quantity of excavated matter suspended therein. It will be obvious, however, that different characters of soil may require a different relation between the water-supply and the discharge-pipes.

An air-lock for the excavating-chamber is indicated at $f^5$ in the top of said chamber, so that if it is desired at any time to inspect the excavating-chamber while the caisson is still extended or to examine the nature of the soil below the caisson or excavating-chamber or to remove any obstructions in the excavating-chamber it will be possible to do so. For this purpose also an air-supply pipe P is provided and connects chamber $f^4$ with a compressed-air supply. This compressed air will not only be useful in cases where it is necessary for a person to enter the excavating-chamber for any purpose, but also when raising the caissons, which operation in certain cases, on account of the considerable friction at the surfaces of the sections, becomes very difficult.

The excavating-tool or excavator proper is shown in the drawings to comprise the brush N, having thick steel bristles $n$. The form and dimensions of the brush are preferably such that in one direction, at least, it will extend substantially the entire width of the lower section of the caisson which it occupies and in this way when the brush is rotated it creates sufficient centrifugal force to carry the excavation to a considerable extent outside and beyond the edge of the lower sections, whereby they will sink of their own weight and will not be required to be provided with cutting edges or other means for sinking them. This brush is provided with a shaft $n'$, journaled in bearings $n^2$, centrally placed in the excavating-chamber, and said brush is operatively connected to the engine L through gearing indicated at $n^3$. When the excavating-chamber is to be inspected, the excavator may be raised by drawing upon the shaft $n'$, so that the bottom of the excavation may be readily gotten at.

When my improved apparatus is to be used for placer-mining or for any other purpose where the excavating-chamber will be sunk or operated vertically, the chamber-support, whatever it may be, will be placed above the scene of operations and the chamber lowered over the place to be excavated. The lowering of the telescoping caisson is effected by loosening the ropes or chains G, and as the caisson sinks the upper sections will be extended in succession until the forward or lower end of the caisson reaches the soil to be excavated, the lower sections and excavating-chamber, when the lowering has been completed, being partially extended and resting upon such soil in a position somewhat as shown in Fig. 5. When the lower section or sections have reached the soil to be excavated, the ropes G are allowed to remain slack. Water is then permitted to flow through pipe O, unless water already exists at the base of operations, the excavating-brush is rotated and effects an excavation somewhat wider than the outer extended section, thereby permitting the caisson to be further extended, which thus sinks of its own weight. The water which is furnished to the excavating-chamber or which exists at the base of operations will substantially fill the excavating-chamber, and the rotation of the brush will effect the cutting away of the soil to be excavated, the spoil being stirred up by the brush which serves as an agitator as well as an excavator. In this way the pump is wholly or partly immersed in the spoil which is contained in the excavating-chamber and which is delivered from the brush or agitator into the pump-inlet, being retained in the excavating-chamber until it passes into said inlet. The spoil is thus choked against the working parts of the pump, which drive it up and out, and there is no possibility of any settling back of the spoil on account of the specific gravity thereof or of the size of its contained particles.

It will be understood that the agitator or excavating-tool is not limited to the precise form of brush shown and described, but may be any tool capable of cutting away the matter to be excavated and of keeping it stirred up in the water to be discharged. In the claims hereinafter the word "agitator" is used to refer to such a tool.

I do not claim herein the method by which the excavations are made as set forth herein, but reserve the right to make such method the subject of another application.

I claim as my invention—

1. In an excavating apparatus, the combination of an excavating-chamber to receive the spoil, an agitator in the chamber, and a pump so arranged with reference to the agitator that the spoil will flow into it without suction.

2. In an excavating apparatus, the combination of an excavating-chamber, an agitator therein, and a pump near the agitator, substantially as described.

3. In an excavating apparatus, the combination of an excavating-chamber, a brush therein, and a centrifugal pump nearly upon a level with the brush, substantially as described.

4. In an excavating apparatus, the combination of an excavating-chamber, a brush in the bottom thereof but not closing the bottom, and a pump near the brush having its inlet just above the brush, substantially as described.

5. In an excavating apparatus, the combination of an excavating-chamber, an agitator therein, a pump near the agitator, and means supported by the chamber to drive the agitator and pump, substantially as described.

6. In an excavating apparatus, the combination of an excavating-chamber, an agitator therein, a pump near the agitator, and an engine supported by the chamber to supply motive power to the agitator, substantially as described.

7. In an apparatus for handling granular material, a pump therefor mounted upon a frame, and a motor upon the frame forming a self-contained excavating device, substantially as described.

8. An apparatus for handling granular material comprising an excavating-pump and an actuating-motor within a pit supported by means outside of the pit, substantially as described.

9. An apparatus for handling granular material, comprising an excavating-pump and an actuating-motor within a pit supported by means of a rope or chain, substantially as described.

10. An apparatus for handling granular material, comprising an excavating-pump within a pit supported by means outside of the pit, and means for moving the pump about within the pit, substantially as described.

11. An apparatus for handling granular material, comprising an excavating-pump within a pit supported by means of a rope or chain, and means for moving the pump about within the pit, substantially as described.

12. An apparatus for handling granular material, a pump therefor mounted upon a frame, and a motor upon the frame, forming a self-contained excavating device, and means for supporting the frame within a pit, said means being outside of the pit, substantially as described.

13. An apparatus for handling granular material, comprising an excavating-pump within a pit supported from the outside of the pit, means for moving the pump about within the pit, and a flexible pipe connecting the pump to the point of discharge.

14. An apparatus for handling granular material, comprising an excavating-pump and an actuating-motor within a pit supported from the outside of the pit, means for moving the pump about within the pit, and a flexible pipe connecting the pump to the point of discharge.

15. An apparatus for handling granular material, comprising an excavating-pump and a supporting-frame therefor within a pit supported from the outside of the pit, means for moving the pump about within the pit, and a flexible pipe connecting the pump to the point of discharge.

16. An apparatus for handling granular material, comprising an excavating-pump, an actuating-motor and a supporting-frame for the pump and motor within a pit supported from the outside of the pit, means for moving the pump about within the pit, and a flexible pipe connecting the pump to the point of discharge.

17. In an excavating apparatus, the combination of an agitator, a pump, a motor, means upon which the agitator pump and motor are mounted to form a self-contained structure, and means to suspend said structure whereby it may be raised and lowered and moved about from one position to another.

This specification signed and witnessed this 23d day of March, A. D. 1903.

THOMAS P. PAYNE.

In presence of—
LUCIUS E. VARNEY,
ROSWELL S. NICHOLS.